(12) United States Patent
Norimatsu et al.

(10) Patent No.: US 8,969,436 B2
(45) Date of Patent: *Mar. 3, 2015

(54) METHOD OF PRODUCING A MOLDED ARTICLE

(75) Inventors: Manabu Norimatsu, Chiyoda-ku (JP);
Tomomitsu Onizawa, Chiyoda-ku (JP);
Seiichi Tanabe, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 988 days.

This patent is subject to a terminal disclaimer.

(21) Appl. No.: 13/060,883

(22) PCT Filed: Aug. 21, 2009

(86) PCT No.: PCT/JP2009/065014
§ 371 (c)(1),
(2), (4) Date: Feb. 25, 2011

(87) PCT Pub. No.: WO2010/024363
PCT Pub. Date: Mar. 4, 2010

(65) Prior Publication Data
US 2011/0147992 A1    Jun. 23, 2011

(30) Foreign Application Priority Data

Aug. 26, 2008 (JP) ................................. 2008-216672

(51) Int. Cl.
*C10C 3/02* (2006.01)
*G02B 1/04* (2006.01)
*C08K 5/5393* (2006.01)

(52) U.S. Cl.
CPC .............. *G02B 1/041* (2013.01); *C08K 5/5393* (2013.01)
USPC ............ 523/307; 528/196; 528/198; 528/370

(58) Field of Classification Search
CPC ............ C08L 69/00; C08K 3/32; C08K 5/51; C08K 5/49
USPC ........... 523/307; 528/196, 198, 370; 359/109, 359/645
See application file for complete search history.

(56) References Cited

U.S. PATENT DOCUMENTS

| 4,873,314 A | 10/1989 | Berg et al. | |
| 8,158,747 B2 * | 4/2012 | Tanabe et al. | 528/370 |
| 2010/0076172 A1 * | 3/2010 | Tanabe et al. | 528/370 |

FOREIGN PATENT DOCUMENTS

| EP | 0280153 A2 | 8/1988 |
| EP | 0351168 A2 | 1/1990 |
| JP | 2001-81302 | 3/2001 |
| JP | 2001-192544 | 7/2001 |
| JP | 2003-48975 | 2/2003 |
| JP | 2004-182842 | 7/2004 |
| JP | 2004-331905 | 11/2004 |
| JP | 2004-346112 | 12/2004 |
| JP | 2007-16069 | 1/2007 |

OTHER PUBLICATIONS

English Translation of JP 2007-16069 (2007).*
International Preliminary Report on Patentability together with English translation of Written Opinion issued Apr. 21, 2011 in International (PCT) Application No. PCT/JP2009/065014.
Office Action issued Oct. 17, 2012 in corresponding Singapore Application No. 201101331-5.
Japanese Office Action (together with English translation) issued Feb. 15, 2011 in corresponding Japanese Application No. 2005-007308.
International Search Report issued Nov. 2, 2009 in corresponding International (PCT) Application No. PCT/JP2009/065014, of record.
Extended European Search Report issued Sep. 15, 2014 in corresponding European Application No. 09810013.4.

* cited by examiner

*Primary Examiner* — Hannah Pak
(74) *Attorney, Agent, or Firm* — Wenderoth, Lind & Ponack, L.L.P.

(57) ABSTRACT

A method of producing a molded article by melting a granule at a temperature of 280 to 380° C. and molding it, wherein the granule satisfies the following conditions (I) and (II): (I) when 100 parts by weight of the granule is cleaned with 100 parts by weight of a 1N nitric acid aqueous solution, the amount of an Fe compound eluted into the 1N nitric acid aqueous solution cleaning fluid is 1 to 100 ppb in terms of the Fe atom based on the granule; and (II) the granule comprises (A) 100 parts by weight of a polycarbonate resin (component a) and (B) 0.00010 to 0.5 parts by weight of a specific phosphorous-based compound (component b).

18 Claims, 1 Drawing Sheet

METHOD OF PRODUCING A MOLDED ARTICLE

TECHNICAL FIELD

The present invention relates to a method of producing a molded article which has high heat resistance at the time of molding, a good color and excellent transparency.

BACKGROUND OF THE ART

Polycarbonate resin is a material which has relatively high heat resistance among polymer materials. However, many types of additives have been used in the polycarbonate resin to meet growing demand for high-function and high-performance materials, thereby reducing the heat resistance of the resin containing such additives.

For example, an internal mold release agent is often added to polycarbonate resin in order to improve the releasability of a resin molded article from a metal mold at the time of melt molding. However, when an effective amount of this internal mold release agent is added, the polycarbonate resin may be colored due to the decomposition of the release agent itself at the time of thermoforming or the induction of the deterioration of the polycarbonate resin by the decomposed product of the release agent.

Patent Document 1 and Patent Document 2 teach that the heat resistance of polycarbonate resin is improved by adding a specific phosphorus-based heat stabilizer to the polycarbonate resin. Although the addition of these heat stabilizers is effective in the improvement of the heat resistance of the polycarbonate, there is a case in which fully satisfactory heat resistance cannot be obtained even by adding a heat stabilizer. When a large amount of the heat stabilizer is used, the mechanical properties and hydrolytic decomposition resistance of the polycarbonate resin may be deteriorated.
(Patent Document 1) JP-A 2001-081302
(Patent Document 2) JP-A 2001-192544

DISCLOSURE OF THE INVENTION

It is an object of the present invention to provide a method of producing a molded article having a good color and excellent transparency by improving the heat resistance of polycarbonate resin at the time of molding.

There have been proposed polycarbonate resin compositions comprising a heat stabilizer as disclosed by Patent Document 1 and Patent Document 2. The development of a new heat stabilizer is desired under the present situation where products are becoming diverse and at the same time, it is now important that the stabilization effect and other properties of existing stabilizers for use in resin compositions comprising a heat stabilizer should be improved as much as possible.

The inventors of the present invention have conducted intensive studies to attain the above object and have found that the heat resistance of polycarbonate resin at the time of molding is significantly improved by adding a small amount of a specific phosphonite-based compound as a heat stabilizer to the polycarbonate resin. They have also found that a melt molded article is colored and the color and transparency of the obtained molded article are greatly deteriorated when a specific amount or more of rust within a tank for blending and storing a polycarbonate resin granule is adhered to the granule. The present invention has been accomplished based on these findings.

That is, according to the present invention, there are provided the following inventions.
1. A method of producing a molded article by melting a granule at a temperature of 280 to 380° C. and molding it, wherein
the granule satisfies the following conditions (I) and (II):
(I) when 100 parts by weight of the granule is cleaned with 100 parts by weight of a 1N nitric acid aqueous solution, the amount of an Fe compound eluted into the 1N nitric acid aqueous solution cleaning fluid is 1 to 100 ppb in terms of the Fe atom based on the granule; and
(II) the granule comprises (A) 100 parts by weight of a polycarbonate resin (component a) and (B) 0.00010 to 0.5 part by weight of at least one phosphorus-based compound (component b) selected from the group consisting of a phosphorus-based compound represented by the following formula (1) (component b-1), a phosphorus-based compound represented by the following formula (2) (component b-2) and a phosphorus-based compound represented by the following formula (3) (component b-3).

[wherein $Ar_1$, $Ar_2$ and $Ar_5$ may be the same or different and are each an aromatic hydrocarbon group having 6 to 20 carbon atoms which may have an alkyl substituent.]

2. The production method according to the above paragraph 1, wherein the granule satisfies the following condition (III) in addition to the conditions (I) and (II):

(III) the granule comprises (A) the polycarbonate resin (component a), (B) the phosphorus-based compound represented by the formula (1) (component b-1), the phosphorus-based compound represented by the formula (2) (component b-2) and the phosphorus-based compound represented by the formula (3) (component b-3), and (C) a phosphorus-based compound represented by the following formula (4) (component c-1) and a phosphorus-based compound represented by the following formula (5) (component c-2); and the total amount of the components b-1 to b-3 and the components c-1 and c-2 is 0.0005 to 0.5 part by weight based on 100 parts by weight of the component a, and the weight ratio (x/y) of the total amount (x parts by weight) of the components b-1 to b-3 to the total amount (y parts by weight) of the components c-1 and c-2 is 0.01 to 2.0.

[wherein $Ar_3$ and $Ar_6$ may be the same or different and are each an aromatic hydrocarbon group having 6 to 20 carbon atoms which may have an alkyl substituent.]

3. The production method according to the above paragraph 1 or 2, wherein the above component b-1 is 4-bis(2,4-di-tert-butylphenyl)-4'-mono(2,4-di-tert-butyl phenyl)-biphenylene diphosphonite, 4-bis(2,4-di-tert-butylphenyl)-3'-mono(2,4-di-tert-butyl phenyl)-biphenylene diphosphonite, 3-bis(2,4-di-tert-butylphenyl)-4'-mono(2,4-di-tert-butyl phenyl)-biphenylene diphosphonite or 3-bis(2,4-di-tert-butylphenyl)-3'-mono(2,4-di-tert-butyl phenyl)-biphenylene diphosphonite.

4. The production method according to any one of the above paragraphs 1 to 3, wherein the above component b-2 is 4,4'-bis(2,4-di-tert-butylphenyl)-biphenylene diphosphonite, 3,4'-bis(2,4-di-tert-butylphenyl)-biphenylene diphosphonite or 3,3'-bis(2,4-di-tert-butylphenyl)-biphenylene diphosphonite.

5. The production method according to any one of the above paragraphs 1 to 4, wherein the above component b-3 is 2,4-di-tert-butylphenyl-4-phenyl-phenyl phosphonite or 2,4-di-tert-butylphenyl-3-phenyl-phenyl phosphonite.

6. The production method according to the above paragraph 2, wherein the above component c-1 is tetrakis(2,4-di-tert-butylphenyl)-4,4'-biphenylene diphosphonite, tetrakis(2,4-di-tert-butylphenyl)-4,3'-biphenylene diphosphonite or tetrakis(2,4-di-tert-butylphenyl)-3,3'-biphenylene diphosphonite.

7. The production method according to the above paragraph 2, wherein the above component c-2 is bis(2,4-di-tert-butylphenyl)-4-phenyl-phenyl phosphonite or bis(2,4-di-tert-butylphenyl)-3-phenyl-phenyl phosphonite.

8. The method according to any one of the above paragraphs 1 to 7, wherein the molded article is an optical lens.

9. The method according to any one of the above paragraphs 1 to 8, wherein the molded article is a spectacle lens.

10. A method of preventing the coloring of a molded article when a granule is molded, wherein
the granule satisfies the following conditions (I) and (II):
(I) when 100 parts by weight of the granule is cleaned with 100 parts by weight of a 1N nitric acid aqueous solution, the amount of an Fe compound eluted into the 1N nitric acid aqueous solution cleaning fluid is 1 to 100 ppb in terms of the Fe atom based on the granule; and
(II) the granule comprises (A) 100 parts by weight of a polycarbonate resin (component a) and (B) 0.00010 to 0.5 part by weight of at least one phosphorus-based compound (component b) selected from the group consisting of a phosphorus-based compound represented by the above formula (1) (component b-1), a phosphorus-based compound represented by the above formula (2) (component b-2) and a phosphorus-based compound represented by the above formula (3) (component b-3).

11. The production method according to the above paragraph 10, wherein the granule satisfies the following condition (III) in addition to the conditions (I) and (II):

(III) the granule comprises (A) the polycarbonate resin (component a), (B) the phosphorus-based compound represented by the above formula (1) (component b-1), the phosphorus-based compound represented by the above formula (2) (component b-2) and the phosphorus-based compound represented by the above formula (3) (component b-3), and (C) a phosphorus-based compound represented by the above formula (4) (component c-1) and a phosphorus-based compound represented by the above formula (5) (component c-2); and the total amount of the components b-1 to b-3 and the components c-1 and c-2 is 0.0005 to 0.5 part by weight based on 100 parts by weight of the component a, and the weight ratio (x/y) of the total amount (x parts by weight) of the components b-1 to b-3 to the total amount (y parts by weight) of the components c-1 and c-2 is 0.01 to 2.0.

12. The production method according to the above paragraph 10 or 11, wherein the above component b-1 is 4-bis(2,4-di-tert-butylphenyl)-4'-mono(2,4-di-tert-butyl phenyl)-biphenylene diphosphonite, 4-bis(2,4-di-tert-butylphenyl)-3'-mono(2,4-di-tert-butyl phenyl)-biphenylene diphosphonite, 3-bis(2,4-di-tert-butylphenyl)-4'-mono(2,4-di-tert-butyl phenyl)-biphenylene diphosphonite or 3-bis(2,4-di-tert-butylphenyl)-3'-mono(2,4-di-tert-butyl phenyl)-biphenylene diphosphonite.

13. The production method according to any one of the above paragraphs 10 to 12, wherein the above component b-2 is 4,4'-bis(2,4-di-tert-butylphenyl)-biphenylene diphosphonite, 3,4'-bis(2,4-di-tert-butylphenyl)-biphenylene diphosphonite or 3,3'-bis(2,4-di-tert-butylphenyl)-biphenylene diphosphonite.

14. The production method according to any one of the above paragraphs 10 to 13, wherein the above component b-3 is 2,4-di-tert-butylphenyl-4-phenyl-phenyl phosphonite or 2,4-di-tert-butylphenyl-3-phenyl-phenyl phosphonite.

15. The production method according to any one of the above paragraphs 10 to 14, wherein the above component c-1 is tetrakis(2,4-di-tert-butylphenyl)-4,4'-biphenylene diphosphonite, tetrakis(2,4-di-tert-butylphenyl)-4,3'-biphenylene diphosphonite or tetrakis(2,4-di-tert-butylphenyl)-3,3'-biphenylene diphosphonite.

16. The production method according to any one of the above paragraphs 10 to 15, wherein the above component c-2 is bis(2,4-di-tert-butylphenyl)-4-phenyl-phenyl phosphonite or bis(2,4-di-tert-butylphenyl)-3-phenyl-phenyl phosphonite.

17. The method according to any one of the above paragraphs 10 to 16, wherein the molded article is an optical lens.

18. The method according to any one of the above paragraphs 10 to 17, wherein the molded article is a spectacle lens.

EXPLANATION OF LETTERS OR NOTATIONS

1 peak of component b-3
2 peak of component b-2
3 peak of component c-2
4 peak of component b-1
5 peak of tris(2,4-di-tert-butylphenyl)phosphite component
6 peak of component c-1

BEST MODE FOR CARRYING OUT THE INVENTION

The present invention will be described in detail hereinunder.
(Method of Producing a Molded Article)
(Polycarbonate Resin (Component a))

The granule used in the present invention comprises a polycarbonate resin (component a) as the main component. The polycarbonate resin (may be simply referred to as "polycarbonate" hereinafter) is obtained by reacting a diphenol with a carbonate precursor. Examples of the reaction include interfacial polycondensation, melt ester interchange, the solid-phase ester interchange of a carbonate prepolymer and the ring-opening polymerization of a cyclic carbonate compound.

Typical examples of the diphenol include dihydroxy compounds such as hydroquinone, resorcinol, 4,4'-dihydroxydiphenyl, 1,4-dihydroxynaphthalene, bis(4-hydroxyphenyl)methane, bis{(4-hydroxy-3,5-dimethyl)phenyl}methane, 1,1-bis(4-hydroxyphenyl)ethane, 1,1-bis(4-hydroxyphenyl)-1-phenylethane, 2,2-bis(4-hydroxyphenyl)propane (commonly known as "bisphenol A"), 2,2-bis{(4-hydroxy-3-methyl)phenyl}propane, 2,2-bis{(4-hydroxy-3,5-dimethyl)phenyl}propane, 2,2-bis{(3,5-dibromo-4-hydroxy)phenyl}propane, 2,2-bis{(3-isopropyl-4-hydroxy)phenyl}propane, 2,2-bis{(4-hydroxy-3-phenyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,4-bis(4-hydroxyphenyl)-2-methylbutane, 2,2-bis(4-hydroxyphenyl)pentane, 2,2-bis(4-hydroxyphenyl)-4-methylpentane, 1,1-bis(4-hydroxyphenyl)cyclohexane, 1,1-bis(4-hydroxyphenyl)-4-isopropylcyclohexane, 1,1-bis(4-hydroxyphenyl)-3,3,5-trimethylcyclohexane, 9,9-bis(4-hydroxyphenyl)fluorene, 9,9-bis{(4-hydroxy-3-methyl)phenyl}fluorene, α,α'-bis(4-hydroxyphenyl)-o-diisopropylbenzene, α,α'-bis(4-hydroxyphenyl)-m-diisopropylbenzene, α,α'-bis(4-hydroxyphenyl)-p-diisopropylbenzene, 1,3-bis(4-hydroxyphenyl)-5,7-dimethyladamantane, 4,4'-dihydroxydiphenyl sulfone, 4,4'-dihydroxydiphenyl sulfoxide, 4,4'-dihydroxydiphenyl sulfide, 4,4'-dihydroxydiphenyl ketone, 4,4'-dihydroxydiphenyl ether and 4,4'-dihydroxydiphenyl ester. These diphenols may be used alone or in combination of two or more.

Out of the above diphenols, 2,2-bis(4-hydroxyphenyl)propane (bisphenol A) is preferred as the main diphenol component. More specifically, the content of bisphenol A is not less than 50 mol %, preferably not less than 70 mol %, more preferably not less than 80 mol % based on the total of all the diphenol components. An aromatic polycarbonate resin comprising a diphenol component substantially composed of bisphenol A is particularly preferred.

The carbonate precursor is a carbonyl halide, carbonate ester or haloformate, as exemplified by phosgene, diphenyl carbonate and dihaloformates of a diphenol.

For the manufacture of the polycarbonate resin from a diphenol and a carbonate precursor by an interfacial polymerization or melt process, one or more diphenols may be used, and a catalyst, a terminal capping agent and an antioxidant for diphenols may be optionally used. The polycarbonate resin may be a branched polycarbonate resin obtained by copolymerizing a polyfunctional aromatic compound having 3 or more aromatic groups. It may be a mixture of two or more polycarbonate resins.

The reaction by the interfacial polymerization process is generally a reaction between a diphenol and phosgene in the presence of an acid binder and an organic solvent. Examples of the acid binder include alkali metal hydroxides such as sodium hydroxide and potassium hydroxide, and amine compounds such as pyridine. Examples of the organic solvent include halogenated hydrocarbons such as methylene chloride and chlorobenzene. A catalyst such as a tertiary amine or quaternary ammonium salt may be used to promote the reaction. The reaction temperature is generally 0 to 40° C., and the reaction time is several minutes to 5 hours.

In the polymerization reaction, a monofunctional phenol may be used as a terminal capping agent. When phosgene is used as the carbonate precursor in the reaction, a monofunctional phenol is generally used as a terminal capping agent to control the molecular weight. The obtained polycarbonate resin is superior in heat stability to a polycarbonate resin whose terminals are not capped by a group derived from a monofunctional phenol. The monofunctional phenol is generally phenol or a lower alkyl-substituted phenol which is a monofunctional phenol represented by the following formula (6) as long as it is used as a terminal capping agent for polycarbonates.

(6)

[wherein A is a hydrogen atom, alkyl group having 1 to 9 carbon atoms or phenylalkyl group having 6 to 15 carbon atoms, and r is an integer of 1 to 5, preferably 1 to 3.]

Examples of the monofunctional phenol include phenol, p-tert-butylphenol, p-cumylphenol and isooctylphenol.

An organic solvent solution of the polycarbonate resin obtained by the above interfacial polycondensation process is generally washed in water. This washing step is carried out by using water having an electric conductivity of 10 μS/cm or less, more preferably 1 μS/cm or less, such as ion exchange water. The above organic solvent solution and water are mixed together, stirred and divided into an organic solvent solution phase and a water phase by standing or using a centrifugal separator to extract the organic solvent solution phase repeatedly so as to remove water-soluble impurities. The water-soluble impurities are removed efficiently by washing in high-purity water, whereby the color of the obtained polycarbonate resin becomes good.

It is also preferred that the organic solvent solution of the polycarbonate resin should be washed with an acid or alkali to remove impurities such as the catalyst.

It is further preferred that foreign matter which is an insoluble impurity should be removed from the organic solvent solution. To remove this foreign matter, the organic solvent solution is preferably filtered or processed by a centrifugal separator.

The solvent is then removed from the organic solvent solution which has been washed in water to obtain a granule of the polycarbonate resin.

To obtain the granule (granulation step), a method of producing slurry by continuously supplying the organic solvent solution of the polycarbonate into a granulator in which a granule and hot water (about 65 to 90° C.) are existent under agitation to evaporate the solvent is preferably employed as it is simple in operation and post-treatment. A mixer such as an agitation tank or kneader is used as the granulator. The produced slurry is continuously discharged from the upper or lower part of the granulator.

The discharged slurry may be then subjected to a hydrothermal treatment. In the hydrothermal treatment step, the organic solvent contained in the slurry is removed by supplying the slurry into a hydrothermal treatment container filled with 90 to 100° C. hot water or setting the temperature of water to 90 to 100° C. by blowing steam after the slurry is supplied.

Water and the organic solvent are preferably removed from the slurry discharged from the granulating step or the slurry after the hydrothermal treatment by filtration or centrifugation, and then the slurry is dried to obtain a granule (powder or flake).

The drier may be of conduction heating system or hot air heating system, and the granule may be left to stand, transferred or stirred. A groove type or cylindrical drier which employs conduction heating system to stir the granule is preferred, and a groove type drier is particularly preferred. The drying temperature is preferably in the range of 130 to 150° C. The granule obtained after drying can be pelletized by a melt extruder. This pellet is to be molded.

The reaction by the melt process is generally an ester interchange reaction between a diphenol and a diphenyl carbonate. The diphenol and the diphenyl carbonate are mixed together in the presence of an inert gas to be reacted with each other under reduced pressure at 120 to 350° C. in most cases. The degree of pressure is changed stepwise and reduced to $1.3 \times 10^2$ Pa or less in the end to remove the formed phenol to the outside of the system. The reaction time is generally about 1 to 4 hours.

The molten polycarbonate resin obtained by the melt ester interchange process can be pelletized by a melt extruder. This pellet is to be molded.

The molecular weight of the polycarbonate resin (component a) in the present invention is preferably $1.0 \times 10^4$ to $5.0 \times 10^4$, more preferably $1.4 \times 10^4$ to $3.5 \times 10^4$ in terms of viscosity average molecular weight (M). The polycarbonate resin having the above viscosity average molecular weight is preferred because a molded article obtained from the polycarbonate resin has certain mechanical strength while maintaining relatively high fluidity at the time of extrusion and molding.

The viscosity average molecular weight in the present invention is M obtained by inserting the specific viscosity ($\eta_{sp}$) of a solution prepared by dissolving 0.7 g of the polycarbonate in 100 ml of methylene chloride at 20° C. into the following equation.

$\eta_{sp}/c = [\eta] + 0.45 \times [\eta]^2 c$ ([η] represents an intrinsic viscosity)

$[\eta] = 1.23 \times 10^{-4} M^{0.83}$ $c = 0.7$

The viscosity average molecular weight of the granule can be measured by the following procedure. That is, the granule is dissolved in methylene chloride in a weight ratio of 1:20 to 1:30, soluble matter is collected by cerite filtration, the solvent is removed, and the soluble matter is fully dried so as to obtain a methylene chloride-soluble solid. 0.7 g of the solid is dissolved in 100 ml of methylene chloride to measure the specific viscosity ($\eta_{sp}$) of the obtained solution at 20° C. with an Ostwald viscometer so as to calculate its viscosity average molecular weight (M) from the above equation.

The granule may be in the form of a powder, pellet or flake. The pellet may have an ordinary shape such as columnar, prismatic or spherical shape but preferably a columnar shape. The diameter of the column is preferably 1 to 5 mm, more preferably 1.5 to 4 mm, much more preferably 2 to 3.3 mm. The length of the column is preferably 1 to 30 mm, more preferably 2 to 5 mm, much more preferably 2.5 to 3.5 mm.

The OH terminal amount of the polycarbonate resin preferably used in the present invention is preferably 1 to 5,000 ppm, more preferably 5 to 2,000 ppm, much more preferably 10 to 1,000 ppm in terms of the weight of the OH group.

(Fe Compound)

In the Present Invention, the Granule Satisfies the following condition (I). That is, (I) when 100 parts by weight of the granule is cleaned with 100 parts by weight of a 1N nitric acid aqueous solution, the amount of an Fe compound eluted into the 1N nitric acid aqueous solution cleaning fluid is 1 to 100 ppb in terms of the Fe atom based on the granule.

The amount of the Fe compound is 1 to 100 ppb, preferably 1 to 50 ppb, more preferably 1 to 40 ppb, much more preferably 1 to 25 ppb, particularly preferably 1 to 10 ppb in terms of the Fe atom based on the granule. When the amount of the Fe compound in terms of the Fe atom is larger than 100 ppb, the heat resistance degrades and the color of a molded article obtained by melt molding the granule tends to become worse disadvantageously.

The amount of the Fe compound can be measured by the following method. That is, a quartz glass conical flask and a quartz glass bar are cleaned with a 1N nitric acid aqueous solution in advance, and it is confirmed that the amount of an Fe component in the 1N nitric acid aqueous solution cleaning fluid is not more than 0.1 ppb. 100 parts by weight of the granule is then put into the inspected conical flask, and 100 parts by weight of a 1N nitric acid aqueous solution is added to the flask, stirred with the inspected glass bar for 1 minute, left to stand for 2 hours, stirred again for 1 minute and then left to stand to determine the amount of Fe by the ICP emission spectrometry of a liquid phase.

The amount of the Fe compound on the surface of the granule is increased by contact between the granule and a tank, container or pipe having a material such as stainless steel (SUS) containing Fe on the inner wall. An increase in the amount of the Fe compound adhered to the surface of the granule becomes significant when part of the inside of the tank, container or pipe rusts or when a welded part on the inner wall cracks.

The amount of the Fe compound adhered to the surface of the granule can be reduced by cleaning the granule with a nitric acid aqueous solution.

It is preferred that the granule should be stored or blended by using a storage tank or blend tank whose inner wall has been passivated. In this case, the amount of the Fe compound on the surface of the granule stored in the tank is measured on a regular basis so that a granule having the Fe compound adhered thereto in an amount larger than the reference value is not used in the manufacture of a molded article which requires a good color and transparency. A granule having the Fe compound adhered thereto in an amount larger than the reference value may be mixed with a granule having a small amount of the Fe compound adhered thereto before molding. The granule to be molded in the present invention is characterized in that the amount of the Fe compound adhered to the surface of the granule falls within a specific range.

The present invention is a method of producing a molded article by melting a granule of a polycarbonate resin stored in a tank at a temperature of 280 to 380° C. and molding it, wherein the granule is molded after it is confirmed that the granule satisfies the above condition (I)

(Phosphorus-Based Compound (Component b))

In the present invention, the granule satisfies the following condition (II). That is, (II) the granule contains (A) 100 parts by weight of the polycarbonate resin (component a) and (B) 0.00010 to 0.5 part by weight of at least one phosphorus-based compound (component b) selected from the group consisting of a phosphorus-based compound represented by the above formula (1) (component b-1), a phosphorus-based compound represented by the above formula (2) (component b-2) and a phosphorus-based compound represented by the above formula (3) (component b-3).

The above phosphorus-based compound (component b) is effective in improving molding heat resistance as a stabilizer for resins. The content of the component b is 0.00010 to 0.5 part by weight, preferably 0.001 to 0.3 part by weight, most preferably 0.003 to 0.1 part by weight based on 100 parts by weight of the polycarbonate resin (component a). When the content of the phosphorus-based compound is lower than 0.00010 part by weight, the molding heat resistance of the polycarbonate resin becomes unsatisfactory disadvantageously.

As for the phosphorus-based compound (component b), the phosphorus-based compounds of the above formulas (1), (2) and (3) are tautomers. The content of each of the tautomers may be arbitrary.

In the formulas (1), (2) and (3), $Ar_1$, $Ar_2$ and $Ar_5$ may be the same or different and are each an aromatic hydrocarbon group having 6 to 20 carbon atoms which may have an alkyl substituent. Examples of the aromatic ring in the aromatic hydrocarbon group include phenyl and naphthyl, out of which phenyl is preferred. The alkyl substituent which may substitute the above aromatic ring is preferably an alkyl group having 1 to 10 carbon atoms such as methyl group, ethyl group, propyl group, isopropyl group, butyl group or tert-butyl group. Out of these, methyl group and tert-butyl group are preferred, and tert-butyl group is particularly preferred.

Examples of the compound (component b-1) of the formula (1) include 4-bis(2,4-di-iso-propylphenyl)-4'-mono(2,4-di-iso-propyl phenyl)-biphenylene diphosphonite, 4-bis(2,4-di-n-butylphenyl)-4'-mono(2,4-di-n-butylphenyl) biphenylene diphosphonite, 4-bis(2,4-di-tert-butylphenyl)-4'-mono(2,4-di-tert-butyl phenyl)-biphenylene diphosphonite, 4-bis(2,4-di-tert-butylphenyl)-3'-mono(2,4-di-tert-butyl phenyl)-biphenylene diphosphonite, 3-bis(2,4-di-tert-butylphenyl)-4'-mono(2,4-di-tert-butyl phenyl)-biphenylene diphosphonite, 3-bis(2,4-di-tert-butylphenyl)-3'-mono(2,4-di-tert-butyl phenyl)-biphenylene diphosphonite, 4-bis(2,6-di-iso-propylphenyl)-4'-mono(2,6-di-iso-propyl phenyl)-biphenylene diphosphonite, 4-bis(2,6-di-n-butylphenyl)-4'-mono(2,6-di-n-butylphenyl) biphenylene diphosphonite, 4-bis(2,6-di-tert-butylphenyl)-4'-mono(2,6-di-tert-butyl phenyl)-biphenylene diphosphonite, 4-bis(2,6-di-tert-butylphenyl)-3'-mono(2,6-di-tert-butyl phenyl)-biphenylene diphosphonite, 3-bis(2,6-di-tert-butylphenyl)-4'-mono(2,6-di-tert-butyl phenyl)-biphenylene diphosphonite, 3-bis(2,6-di-tert-butylphenyl)-3'-mono(2,6-di-tert-butyl phenyl)-biphenylene diphosphonite, 4-bis(2,4-di-tert-butyl-5-methylphenyl)-4'-mono(2,4-di-tert-butyl-5-methylphenyl)-biphenylene diphosphonite, 4-bis(2,4-di-tert-butyl-5-methylphenyl)-3'-mono(2,4-di-tert-butyl-5-methylphenyl)-biphenylene diphosphonite, 3-bis(2,4-di-tert-butyl-5-methylphenyl)-4'-mono(2,4-di-tert-butyl-5-methylphenyl)-biphenylene diphosphonite and 3-bis(2,4-di-tert-butyl-5-methylphenyl)-3'-mono(2,4-di-tert-butyl-5-methylphenyl)-biphenylene diphosphonite.

Out of these, tris(di-tert-butylphenyl)-biphenylene diphosphonites are preferred, and tris(2,4-di-tert-butylphenyl)-biphenylene diphosphonites are more preferred. More specifically, the tris(2,4-di-tert-butylphenyl)-biphenylene diphosphonites are preferably 4-bis(2,4-di-tert-butylphenyl)-4'-mono(2,4-di-tert-butyl phenyl)-biphenylene diphosphonite, 4-bis(2,4-di-tert-butylphenyl)-3'-mono(2,4-di-tert-butyl phenyl)-biphenylene diphosphonite, 3-bis(2,4-di-tert-butylphenyl)-4'-mono(2,4-di-tert-butyl phenyl)-biphenylene diphosphonite and 3-bis(2,4-di-tert-butylphenyl)-3'-mono(2,4-di-tert-butyl phenyl)-biphenylene diphosphonite.

Examples of the compound (component b-2) of the formula (2) include 4,4'-bis(2,4-di-iso-propylphenyl)-biphenylene diphosphonite, 4,4'-bis(2,4-di-n-butylphenyl)-biphenylene diphosphonite, 4,4'-bis(2,4-di-tert-butylphenyl)-biphenylene diphosphonite, 3,4'-bis(2,4-di-tert-butylphenyl)-biphenylene diphosphonite, 3,3'-bis(2,4-di-tert-butylphenyl)-biphenylene diphosphonite, 4,4'-bis(2,6-di-iso-propylphenyl)-biphenylene diphosphonite, 4,4'-bis(2,6-di-n-butylphenyl)-biphenylene diphosphonite, 4,4'-bis(2,6-di-tert-butylphenyl)-biphenylene diphosphonite, 3,4'-bis(2,6-di-tert-butylphenyl)-biphenylene diphosphonite, 3,3'-bis(2,6-di-tert-butylphenyl)-biphenylene diphosphonite, 4,4'-bis(2,4-di-tert-butyl-5-methylphenyl)-biphenylene diphosphonite, 3,4'-bis(2,4-di-tert-butyl-5-methylphenyl)-biphenylene diphosphonite and 3,3'-bis(2,4-di-tert-butyl-5-methylphenyl)-biphenylene diphosphonite.

Examples of the compound (component b-3) of the formula (3) include 2,4-di-iso-propylphenyl-4-phenyl-phenyl phosphonite, 2,4-di-n-butylphenyl-3-phenyl-phenyl phosphonite, 2,4-di-tert-butylphenyl-4-phenyl-phenyl phosphonite, 2,4-di-tert-butylphenyl-3-phenyl-phenyl phosphonite, 2,6-di-iso-propylphenyl-4-phenyl-phenyl phosphonite, 2,6-di-n-butylphenyl-3-phenyl-phenyl phosphonite, 2,6-di-tert-butylphenyl-4-phenyl-phenyl phosphonite, 2,6-di-tert-butylphenyl-3-phenyl-phenyl phosphonite and 2,4-di-tert-butyl-5-methylphenyl-3-phenyl-phenyl phosphonite.

Out of these, (di-tert-butylphenyl)-phenyl-phenyl phosphonites are preferred, and (2,4-di-tert-butylphenyl)-phenyl-phenyl phosphonites are particularly preferred. More specifically, 2,4-di-tert-butylphenyl-4-phenyl-phenyl phosphonite and 2,4-di-tert-butylphenyl-3-phenyl-phenyl phosphonite are preferred.

(Phosphorus-Based Compound (Component c))

In the present invention, the phosphorus-based compound used as the above component b can be obtained by hydrolyzing the phosphorus-based compound (component c) of the formula (4) or (5). That is, the phosphorus-based compound (component b-1) of the formula (1) and the phosphorus-based compound (component b-2) of the formula (2) can be obtained by hydrolyzing the phosphorus-based compound (component c-1) of the formula (4). The phosphorus-based compound (component b-3) of the formula (3) can be obtained by hydrolyzing the phosphorus-based compound (component c-2) of the formula (5).

Therefore, the granule preferably satisfies the following condition (III) in addition to the conditions (I) and (II).

That is, (III) the granule contains (A) the polycarbonate resin (component a), (B) the phosphorus-based compound represented by the formula (1) (component b-1), the phosphorus-based compound represented by the formula (2) (component b-2) and the phosphorus-based compound represented by the formula (3) (component b-3) and (C) a phosphorus-based compound represented by the following formula (4) (component c-1) and a phosphorus-based compound represented by the following formula (5) (component c-2), the total amount of the components b-1 to b-3 and c-1 and c-2 being preferably 0.0005 to 0.5 part by weight based on 100 parts by weight of the component a, and the weight ratio (x/y) of the total amount (x parts by weight) of the components b-1 to b-3 to the total amount (y parts by weight) of the components c-1 and c-2 being preferably 0.01 to 2.0.

(4)

(5)

In the formulas (4) and (5), $Ar_3$ and $Ar_6$ may be the same or different and are each an aromatic hydrocarbon group having 6 to 20 carbon atoms which may have an alkyl substituent. Examples of the aromatic ring in the aromatic hydrocarbon group include phenyl and naphthyl, out of which phenyl is preferred. The alkyl substituent which may substitute the aromatic ring is preferably an alkyl group having 1 to 10 carbon atoms such as methyl group, ethyl group, propyl group, isopropyl group, butyl group and tert-butyl group. Out of these, methyl group and tert-butyl group are preferred, and tert-butyl group is particularly preferred.

Examples of the compound (component c-1) of the formula (4) include tetrakis(2,4-di-iso-propylphenyl)-4,4'-biphenylene diphosphonite, tetrakis(2,4-di-n-butylphenyl)-4,4'-biphenylene diphosphonite, tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-iso-propylphenyl)-4,4'-biphenylene diphosphonite, tetrakis(2,6-di-n-butylphenyl)-4,4'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, tetrakis(2,4-di-tert-butyl-5-methylphenyl)-4,4'-biphenylene diphosphonite, tetrakis(2,4-di-tert-butyl-5-methylphenyl)-4,3'-biphenylene diphosphonite and tetrakis(2,4-di-tert-butyl-5-methylphenyl)-3,3'-biphenylene diphosphonite.

Out of these, tetrakis(di-tert-butylphenyl)-biphenylene diphosphonites are preferred, and tetrakis(2,4-di-tert-butylphenyl)-biphenylene diphosphonites are more preferred. More specifically, the tetrakis(2,4-di-tert-butylphenyl)-biphenylene diphosphonites are preferably tetrakis(2,4-di-tert-butylphenyl)-4,4'-biphenylene diphosphonite, tetrakis(2,4-di-tert-butylphenyl)-4,3'-biphenylene diphosphonite and tetrakis(2,4-di-tert-butylphenyl)-3,3'-biphenylene diphosphonite. These compounds may be used in combination of two or more.

Examples of the compound (component c-2) of the formula (5) include bis(2,4-di-iso-propylphenyl)-4-phenyl-phenyl phosphonite, bis(2,4-di-n-butylphenyl)-3-phenyl-phenyl phosphonite, bis(2,4-di-tert-butylphenyl)-4-phenyl-phenyl phosphonite, bis(2,4-di-tert-butylphenyl)-3-phenyl-phenyl phosphonite, bis(2,6-di-iso-propylphenyl)-4-phenyl-phenyl phosphonite, bis(2,6-di-n-butylphenyl)-3-phenyl-phenyl phosphonite, bis(2,6-di-tert-butylphenyl)-4-phenyl-phenyl phosphonite, bis(2,6-di-tert-butylphenyl)-3-phenyl-phenyl phosphonite and bis(2,4-di-tert-butyl-5-methylphenyl)-3-phenyl-phenyl phosphonite.

Out of these, bis(di-tert-butylphenyl)-phenyl-phenyl phosphonites are preferred, and bis(2,4-di-tert-butylphenyl)-phenyl-phenyl phosphonites are more preferred. More specifically, the bis(2,4-di-tert-butylphenyl)-phenyl-phenyl phosphonites are preferably bis(2,4-di-tert-butylphenyl)-4-phenyl-phenyl phosphonite and bis(2,4-di-tert-butylphenyl)-3-phenyl-phenyl phosphonite. These compounds may be used in combination of two or more.

When the above phosphorus-based compound (component b) is to be mixed with the polycarbonate resin (component a), a phosphorus-based compound obtained by hydrolyzing a phosphorus-based compound containing a mixture of the components c-1 and c-2 can be preferably used.

In this case, the phosphorus-based compound to be mixed with the polycarbonate resin (component a) is a phosphorus-based compound which contains components b and c. In this phosphorus-based compound, the weight ratio (x/y) of the total amount (x parts by weight) of the components b-1 to b-3 to the total amount (y parts by weight) of the components c-1 and c-2 is preferably 0.01 to 2.0, more preferably 0.03 to 1.8. This phosphorus-based compound is mixed to ensure that the total amount of the components b-1 to b-3 and the components c-1 and c-2 becomes 0.0005 to 0.5 part by weight, preferably 0.001 to 0.3 part by weight, more preferably 0.003 to 0.2 part by weight based on 100 parts by weight of the polycarbonate resin (component a). When the content of the phosphorus-based compound is lower than 0.0005 part by weight, the molding heat resistance of the polycarbonate resin becomes unsatisfactory disadvantageously. Even when the content of the phosphorus-based compound is higher than 0.5 part by weight, it does not have a bad effect on the characteristic properties of the polycarbonate resin but the phosphorus-based compound is fused and solidified by the absorption of moisture with the result of reduced handling ease.

(Another Phosphorus-Based Compound)

In the present invention, a phosphorus-based compound except for the above components b and the above components c may be mixed with the polycarbonate resin (component a) as a heat stabilizer. Examples of the phosphorus-based compound include tris(dialkyl-substituted phenyl)phosphites such as tris(dimethylphenyl)phosphite, tris(diethylphenyl)phosphite, tris(di-iso-propylphenyl)phosphite, tris(di-n-butylphenyl)phosphite, tris(2,4-di-tert-butylphenyl)phosphite, tris(2,6-di-tert-butylphenyl)phosphite and tris(2,4-di-tert-butyl-5-methylphenyl)phosphite. Bis(2,6-di-tert-butyl-4-methylphenyl)pentaerythritol diphosphite, 2,2-methylenebis(4,6-di-tert-butylphenyl)octyl phosphite, bis(nonylphenyl) pentaerythritol diphosphite, bis(2,4-di-tert-butylphenyl) pentaerythritol diphosphite, distearyl pentaerythritol diphosphite, tributyl phosphate, triethyl phosphate, trimethyl phosphate, triphenyl phosphate, diphenyl monoorthoxenyl phosphate, dibutyl phosphate, dioctyl phosphate, diisopropyl phosphate, dimethyl benzenephosphonate, diethyl benzenephosphonate and dipropyl benzenephosphonate are also included in the above examples.

Out of these, tris(di-tert-butylphenyl)phosphites are preferred, and tris(2,4-di-tert-butylphenyl)phosphite is particularly preferred. These phosphorus-based compounds may be used alone or in combination of two or more. The phosphorus-based compound is used in an amount of preferably 0.0005 to 0.2 part by weight, more preferably 0.005 to 0.1 part by weight based on 100 parts by weight of the polycarbonate resin (component a).

(Release Agent)

In the present invention, an internal mold release agent may be mixed with the polycarbonate resin to improve the releasability from a metal mold of a resin molded article at the time of melt molding. Preferably, the internal mold release agent comprises not less than 90 wt % of an ester of an alcohol and a fatty acid. The ester of an alcohol and a fatty acid is, for example, an ester of a monohydric alcohol and a fatty acid and/or a partial or whole ester of a polyhydric alcohol and a fatty acid. The ester of a monohydric alcohol and a fatty acid is preferably an ester of a monohydric alcohol having 1 to 20 carbon atoms and a saturated fatty acid having 10 to 30 carbon atoms. The partial or whole ester of a polyhydric alcohol and a fatty acid is preferably a partial or whole ester of a polyhydric alcohol having 1 to 25 carbon atoms and a saturated fatty acid having 10 to 30 carbon atoms.

Examples of the ester of a monohydric alcohol and a saturated fatty acid include stearyl stearate, palmityl palmitate, butyl stearate, methyl laurate and isopropyl palmitate, out of which stearyl stearate is preferred.

Examples of the partial or whole ester of a polyhydric alcohol and a saturated fatty acid include monoglyceride stearate, diglyceride stearate, triglyceride stearate, monosorbitate stearate, monoglyceride behenate, pentaerythritol monostearate, pentaerythritol tetrastearate, pentaerythritol tetrapelargonate, propylene glycol monostearate, biphenyl biphenate, sorbitan monostearate, 2-ethylhexyl stearate and a partial or whole ester of a dipentaerythritol such as dipentaerythritol hexastearate.

Out of these esters, monoglyceride stearate, triglyceride stearate, pentaerythritol tetrastearate and a mixture of triglyceride stearate and stearyl stearate are preferred. Monoglyceride stearate is particularly preferred.

The content of the above ester in the internal mold release agent is not less than 90 wt %, more preferably not less than 95 wt % based on 100 wt % of the internal mold release agent.

The acid value of the above fatty acid ester is preferably not more than 3, more preferably not more than 2. Monoglyceride stearate preferably has an acid value of not more than 1.5 and a purity of not less than 95 wt %, particularly preferably an acid value of not more than 1.2 and a purity of not less than 98 wt %. The acid value of the fatty acid ester can be measured by a known method.

Examples of the internal mold release agent except for the above esters include olefin-based wax, olefin-based waxes containing a carboxyl group and/or a carboxylic anhydride group, silicone oil, organopolysiloxane, paraffin wax and bees wax.

The content of the internal mold release agent in the polycarbonate resin is preferably 0.001 to 1.0 part by weight, more preferably 0.01 to 0.6 part by weight, most preferably 0.1 to 0.5 part by weight based on 100 parts by weight of the polycarbonate resin.

(Ultraviolet Absorbent)

The granule may contain an ultraviolet absorbent. At least one any known ultraviolet absorbent may be selected. The ultraviolet absorbent is selected from a benzotriazole-based ultraviolet absorbent, benzophenone-based ultraviolet absorbent and triazine-based ultraviolet absorbent. Out of these, a benzotriazole-based ultraviolet absorbent is particularly preferred because it produces an effect such as the molding heat resistance of the polycarbonate resin more effectively.

The amount of the ultraviolet absorbent is preferably 0.01 to 1.5 parts by weight, more preferably 0.05 to 0.7 part by weight, much more preferably 0.1 to 0.5 part by weight based on 100 parts by weight of the polycarbonate resin. Within the above range, the effects of the phosphorus-based compounds in the present invention are fully obtained, the object of the present invention can be attained, and satisfactory weatherability is provided to the polycarbonate resin advantageously.

Examples of the benzotriazole-based ultraviolet absorbent include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2N-benzotriazol-2-yl)phenol], 2-(2-hydroxy-3,5-di-tert-butylphenyl)benzotriazole, 2-(2-hydroxy-3,5-di-tert-butylphenyl)-5-chlorobenzo triazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl) benzotriazole, 2,2'-methylenebis(4-cumyl-6-benzotriazolephenyl), 2,2'-p-phenylenebis(1,3-benzoxazin-4-one) and 2-[2-hydroxy-3-(3,4,5,6-tetrahydrophthalimidomethyl)-5-methylphenyl] benzotriazole. They may be used alone or in combination of two or more.

2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2H-benzotriazol-2-yl)phenol] and 2-[2-hydroxy-3-(3,4,5,6-tetrahydrophthalimidomethyl)-5-methylphenyl] benzotriazole are preferred, and 2-(2-hydroxy-5-tert-octylphenyl)benzotriazole and 2,2'-methylenebis[4-(1,1,3,3-tetramethylbutyl)-6-(2H-benzotriazol-2-yl)phenol] are more preferred. 2-(2-hydroxy-5-tert-octylphenyl)benzotriazole is particularly preferred.

The benzotriazole-based ultraviolet absorbent has a drying loss of preferably not more than 0.5 wt %, more preferably not more than 0.1 wt %, particularly preferably not more than 0.03 wt % when it is dried at 105° C. for 2 hours. The benzotriazole-based ultraviolet absorbent has a 500 nm dissolution color (light transmittance of a 1 cm cell obtained by dissolving 5 g of the ultraviolet absorbent in 100 ml of toluene) of preferably not less than 95%, more preferably not less than 98%, particularly preferably not less than 99%.

Examples of the benzophenone-based ultraviolet absorbent include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydriderate benzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodium sulfoxybenzophenone, bis(5-benzoyl-4-hydroxy-2-methoxyphenyl)methane, 2-hydroxy-4-n-dodecyloxybenzophenone and 2-hydroxy-4-methoxy-2'-carboxybenzophenone.

Examples of the triazine-based ultraviolet absorbent include 2-(4,6-diphenyl-1,3,5-triazin-2-yl)-5-[(hexyl)oxy]-phenol, and 2-(4,6-bis(2,4-dimethylphenyl)-1,3,5-triazin-2-yl)-5-[(octyl)oxy]-phenol.
(Hindered Phenol-Based Stabilizer)

The granule may contain a hindered phenol-based stabilizer as long as the object of the present invention is not impaired.

Examples of the hindered phenol-based stabilizer include pentaerythritol tetrakis[3-(3,5-di-tert-butyl-4-hydroxyphenyl)propionate], thiodiethylenebis[3-(3,5-di-tert-butyl-4-hydroxyphenyl)propionate], octadecyl-3-(3,5-di-tert-butyl-4-hydroxyphenyl)propionate, 3,5-bis(1,1-dimethylethyl)-4-hydroxyalkyl ester benzenepropanoates (the alkyl has a side chain with 7 to 9 carbon atoms), 2,4-dimethyl-6-(1-methylpentadecyl)phenol, 3,3',3'',5,5',5''-hexa-tert-butyl-a,a',a''-(mesitylene-2,4,6-toluoyl)tri-p-cresol, ethylenebis(oxyethylene)bis[3-(5-tert-butyl-4-hydroxy-m-tolyl)propionate], hexamethylenebis[3-(3,5-di-tert-butyl-4-hydroxyphenyl) propionate and 1,3,5-tris(3,5-di-tert-butyl-4-hydroxybenzyl)-1,3,5-triazine-2,4,6(1H,3H,5H)-trione. Out of these, pentaerythritol tetrakis[3-(3,5-di-tert-butyl-4-hydroxyphenyl)propionate] and octadecyl-3-(3,5-di-tert-butyl-4-hydroxyphenyl)propionate are preferred.

The amount of the hindered phenol-based stabilizer is preferably 0.015 to 0.15 part by weight, more preferably 0.03 to 0.08 part by weight based on 100 parts by weight of the polycarbonate resin.
(Antioxidant)

The granule may contain an antioxidant to prevent its oxidation. Examples of the antioxidant include pentaerythritol tetrakis(3-mercaptopropionate), pentaerythritol tetrakis(3-laurylthiopropionate), glycerol-3-stearyl thiopropionate, triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], pentaerythritol-tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocinnamide), 3,5-di-tert-butyl-4-hydroxybenzylphosphonate-diethyl ester, tris(3,5-di-tert-butyl-4-hydroxybenzyl)isocyanurate, tetrakis(2,4-di-tert-butylphenyl) 4,4'-biphenylene diphosphinate and 3,9-bis{1,1-dimethyl-2-[β-(3-tert-butyl-4-hydroxy-5-methylphenyl)propionyloxy]ethyl}-2,4,8,10-tetraoxaspiro(5,5)undecane. The amount of the antioxidant is preferably 0.001 to 0.05 part by weight based on 100 parts by weight of the polycarbonate resin.
(Antistatic Agent)

The granule may contain an antistatic agent. Examples of the antistatic agent include polyether ester amides, ammonium salts of dodecylbenzenesulfonic acid, phosphonium salts of dodecylbenzenesulfonic acid, monoglyceride maleic anhydride, diglyceride maleic anhydride, carbon, graphite and metal powders. Further, "partial esters of a polyhydric alcohol and a saturated fatty acid" such as glycerin monostearate are also included in the above examples. The polyhydric alcohol and the fatty acid may have a low molecular weight or a high molecular weight, and an aromatic ring may be partially introduced into these. Not only an alcohol moiety but also a fatty acid moiety may have a branch structure. The amount of the antistatic agent is preferably 0.1 to 10 parts by weight based on 100 parts by weight of the polycarbonate resin.
(Bluing Agent)

The granule may contain a bluing agent as long as the object of the present invention is not impaired. The bluing agent is effective in erasing the yellow tinge of the resin composition. Since a composition provided with weatherability contains a predetermined amount of an ultraviolet absorbent, a resin product is apt to be tinged with yellow according to "the function and color of the ultraviolet absorbent". To provide natural transparency to a sheet or lens product in particular, use of the bluing agent is very effective. The amount of the bluing agent is preferably 0.05 to 1.5 ppm, more preferably 0.1 to 1.2 ppm based on the granule. Typical examples of the bluing agent include the Macrolex Violet and Terasol Blue RLS of Bayer Co., Ltd. However, the bluing agent is not particularly limited.
(Flame Retardant)

The granule may contain a flame retardant in limits that do not impair the object of the present invention. Examples of the flame retardant include polycarbonate-based flame retardants of halogenated bisphenol A, organic salt-based flame retardants, halogenated aromatic phosphate-based flame retardants and aromatic phosphate-based flame retardants. The granule may contain at least one of them.

The polycarbonate-based flame retardants of halogenated bisphenol A include polycarbonate type flame retardants of tetrabromobisphenol A and copolycarbonate type flame retardants of tetrabromobisphenol A and bisphenol A.

The organic salt-based flame retardants include dipotassium diphenylsulfone-3,3'-disulfonate, potassium diphenylsulfone-3-sulfonate, sodium 2,4,5-trichlorobenzenesulfonate, potassium 2,4,5-trichlorobenzenesulfonate, potassium bis(2,6-dibromo-4-cumylphenyl)phosphate, sodium bis(4-cumylphenyl)phosphate, potassium bis(p-toluenesulfone)imide, potassium bis(diphenylphosphate)imide, potassium bis(2,4,6-tribromophenyl)phosphate, potassium bis(2,4-dibromophenyl)phosphate, potassium bis(4-bromophenyl)phosphate, potassium diphenylphosphate, sodium diphenylphosphate, potassium perfluorobutanesulfonate, sodium or potassium laurylsulfate and sodium or potassium hexadecylsulfate.

The halogenated aromatic phosphate-based flame retardants include tris(2,4,6-tribromophenyl)phosphate, tris(2,4-dibromophenyl)phosphate and tris(4-bromophenyl)phosphate.

The aromatic phosphate-based flame retardants include triphenyl phosphate, tris(2,6-xylyl)phosphate, tetrakis(2,6-xylyl)resorcin diphosphate, tetrakis(2,6-xylyl)hydroquinone diphosphate, tetrakis(2,6-xylyl)-4,4'-biphenol diphosphate, tetraphenyl resorcin diphosphate, tetraphenyl hydroquinone diphosphate, tetraphenyl-4,4'-biphenol diphosphate, aromatic polyphosphates containing no phenolic OH group obtained from resorcin and phenol as aromatic ring sources, aromatic polyphosphates containing a phenolic OH group obtained from resorcin and phenol as aromatic ring sources, aromatic polyphosphates containing no phenolic OH group obtained from hydroquinone and phenol as aromatic sources, aromatic polyphosphates containing a phenolic OH group obtained from hydroquinone and phenol as aromatic sources (the aromatic polyphosphates shown below mean both aromatic polyphosphates containing a phenolic OH group and aromatic polyphosphates containing no phenolic OH group), aromatic polyphosphates obtained from bisphenol A and phenol as aromatic ring sources, aromatic polyphosphates obtained from tetrabromobisphenol A and phenol as aromatic ring sources, aromatic polyphosphates obtained from resorcin and 2,6-xylenol as aromatic ring sources, aromatic polyphosphates obtained from hydroquinone and 2,6-xylenol as aromatic ring sources, aromatic polyphosphates obtained from bisphenol A and 2,6-xylenol as aromatic ring sources and aromatic polyphosphates obtained from tetrabromobisphenol A and 2,6-xylenol as aromatic ring sources.

(Another Resin, Elastomer)

The granule may contain small amount of another resin or elastomer in limits that do not impair the object of the present invention.

Examples of the another resin include polyester resins such as polyethylene terephthalate and polybutylene terephthalate, polyamide resin, polyimide resin, polyether imide resin, polyurethane resin, silicone resin, polyphenylene ether resin, polyphenylene sulfide resin, polysulfone resin, polyolefin resins such as polyethylene and polypropylene, polystyrene resin, acrylonitrile/styrene copolymer (AS resin), acrylonitrile/butadiene/styrene copolymer (ABS resin), polymethacrylate resin, phenol resin and epoxy resin.

Examples of the elastomer include isobutylene/isoprene rubber, styrene/butadiene rubber, ethylene/propylene rubber, acrylic-based elastomer, polyester-based elastomers, polyamide-based elastomers, MBS (methyl methacrylate/styrene/butadiene) rubber which is a core-shell type elastomer, and MAS (methyl methacrylate/acrylonitrile/styrene) rubber.

(Production of Granule)

Any method is employed to blend the polycarbonate resin (component a) with the phosphorus-based compound (component b) and other additives. For example, a method for mixing them together by means of a tumbler, twin-cylinder mixer, super mixer, Nauter mixer, Banbury mixer, kneading roll or extruder is suitably employed. The powdery and pellet-like granule may be molded into a molded article or sheet by a generally known method such as injection molding, extrusion molding, compression molding or sheet extrusion directly or after it is formed into a pellet by a melt extruder.

The phosphorus-based compound and other additives may be blended with the polycarbonate resin in one stage or two or more stages. To blend them together in two stages, part of the polycarbonate resin powder or pellet is blended with the additives, that is, the additives are diluted with the polycarbonate resin powder to prepare a master batch of the additives which is finally blended.

For example, to blend them together in one stage, a method in which a mixture of predetermined amounts of additives is blended with the polycarbonate resin powder or pellet, or a method in which predetermined amounts of additives are weighed separately, added to the polycarbonate resin powder or pellet one after another and blended with it may be employed.

To blend the phosphorus-based compound and other additives, the additives may be directly added and injected into an extruder. In this case, the additives may be injected after they are molten by heating.

In the solution polymerization (interfacial polymerization) process, a method in which the organic solvent solution of the polycarbonate resin after polymerization is introduced into stirred hot water to produce a polycarbonate granule in a stirred stream is often employed. In this case, the phosphorus-based compound containing the above component c is added to and dissolved in the organic solvent solution of the polycarbonate resin, and the resulting solution is introduced into hot water to hydrolyze part of the phosphorus-based compound as the component c so as to modify it into the above component b, thereby introducing the above component b into the polycarbonate resin.

(Molding)

The granule is molten at a temperature of 280 to 380° C. to be molded. Molding may be injection molding, compression molding, extrusion compression molding, rotational molding, blow molding or sheet extrusion.

Examples of the molded article include optical lenses such as spectacle lenses, camera lenses, binocular lenses, microscope lenses, projector lenses, Fresnel lenses, lenticular lenses, fθ lenses, head lamp lenses and pick-up lenses, car window glasses, roofs, head lamp covers, buttons for mobile phones, phase difference plates, polarizing plates, light diffusion plates, faces plates (protective covers for meters), helmet shields and sheets such as windshield sheets for motorcycles.

Since a molded article having excellent heat resistance, a good color and high total light transmittance (transparency) is obtained by the production method of the present invention, the production method is advantageously used for the molding of optical lenses, particularly spectacle lenses.

According to the present invention, a molded article which is a 5 mm-thick flat plate having a color (YI value) of preferably 0.3 to 3.0, more preferably 0.5 to 2.0 when measured by a transmission method in accordance with ASTM D1925 can be obtained. According to the present invention, a molded article which is a 2 mm-thick flat plate having a total light transmittance of not less than 90% in accordance with ISO 13468 can be obtained.

(Coloring Prevention Method)

The present invention includes a method of preventing the coloring of a molded article when the granule is molded, wherein the granule satisfies the above conditions (I) and (II).

The granule preferably satisfies the above condition (III) in addition to the conditions (I) and (II). The components b-1, b-2, b-3, c-1 and c-2 are as described above. In this method, the molded article is preferably an optical lens, particularly preferably a spectacle lens.

EXAMPLES

The following examples are provided for the purpose of further illustrating the present invention but are in no way to be taken as limiting. "Parts" means parts by weight and evaluations were made by the following methods.

I. Evaluation (1) Method of Determining the Amount of an Fe Compound on the Surface of a Pellet A 300 ml quartz glass conical flask and a quartz glass bar were cleaned with 100 ml of a 1N nitric acid aqueous solution in advance, and it was confirmed that the content of an Fe component in the 1N nitric acid aqueous solution cleaning fluid was not more than 0.1 ppb. The quartz glass conical flask was made empty, 100 g of the pellet was put into the flask, and 100 g of a 1N nitric acid aqueous solution was added to the flask and stirred with the quartz glass bar for 1 minute. The solution was left to stand for 2 hours, stirred again for 1 minute and left to stand to determine the content of the Fe atom in a liquid phase by ICP emission spectrometry and express the weight of the Fe atom in the Fe compound eluted into the 1N nitric acid aqueous solution cleaning fluid as a concentration (ppb) based on the weight of the pellet.

(2) Determination of Composition of Phosphorus-Based Compound (Phosphorus-Based Stabilizer Used in Examples)

10 mg of a phosphorus-based compound was dissolved in 25 ml of hexane to carry out high-speed liquid chromatography (HPLC) under conditions shown in Table 1. Peak components were separated for each peak and isolated by using a fraction collector connected to an HPLC apparatus. The solvent was removed from the isolated components, each component was dried up, and a certain weight of each component was measured off and dissolved in hexane to prepare a reference solution so as to draw a calibration curve. Acetonitrile (AN), isopropanol (IPA) and hexane dehydrated by a molecular sieve were used.

Used Reagents

Hexane; manufactured by Wako Pure Chemical Industries, Ltd., for high-speed liquid chromatography Acetonitrile; manufactured by Wako Pure Chemical Industries, Ltd., for high-speed liquid chromatography Isopropanol; manufactured by Wako Pure Chemical Industries, Ltd., for high-speed liquid chromatography Molecular sieve; manufactured by Wako Pure Chemical Industries, Ltd., 4A 1/16

TABLE 1

| HPLC apparatus | | | |
|---|---|---|---|
| 8020 series of Tosoh Corporation | | | |
| Degasser | SD-8022 | | |
| Pump | CCPS X 2 | | |
| Column oven | CO-8020 | | |
| Auto sampler | AS-8020 | | |
| Ultraviolet-visible detector | UV-8020 | | |
| Fraction collector | FC-8020 | | |
| Data processing unit | SC-8020 | | |
| Column | ODS-120T 4.6 × 250 mm Tosoh Corporation | | |
| Operation conditions | | | |
| Column temperature | 40° C. | | |
| Flow rate | 1 ml/min | | |
| Concentration of sample | 15 mg/25 mL | | |
| Amount of injection | 10 μL | | |
| Eluant | isopropanol (IPA) acetonitrile (AN) | | |
| Gradient | R.T. (min) | IPA (%) | AN (%) |
| | 0 | 5 | 95 |
| | 15 | 5 | 95 |
| | 20 | 30 | 70 |
| | 30 | 30 | 70 |
| | 35 | 40 | 60 |
| | 50 | 40 | 60 |

(3) Color (YI Value)

After the pellet was dried at 120° C. for 5 hours, it was molded into a flat plate having a length of 70 mm, a width of 50 mm and a thickness of 5 mm by the J85-EL2 injection molding machine of JSW Co., Ltd. at a cylinder temperature of 300° C. and a mold temperature of 105° C. The color (YI value) of this 5 mm-thick flat plate was measured with a C light source at a view angle of 2° by using the Color-Eye7000A of Gretag Macbeth Co., Ltd. in accordance with a transmission method specified in ASTM D1925. Although the YI value changes according to the amount of an additive, when the amount of the additive is the same, as the YI value becomes smaller, discoloration at the time of molding becomes less and heat resistance becomes higher.

The existence of the dullness of the flat plate was visually inspected.

(4) Total Light Transmittance

After the pellet was dried at 120° C. for 5 hours, it was molded into a flat plate having a length of 90 mm, a width of 50 mm and a thickness of 2 mm by the J85-EL2 injection molding machine of JSW Co., Ltd. at a cylinder temperature of 350° C. and a mold temperature of 80° C. The total light transmittance of this 2 mm-thick flat plate was measured by using the NDH-2000 of Nippon Denshoku Co., Ltd. in accordance with ISO13468.

(5) Molding Heat Resistance (Residence Heat Resistance)

After the pellet was dried at 120° C. for 5 hours, it was molded into a "flat plate for measuring color before residence" (length of 70 mm, width of 50 mm and thickness of 2 mm) by the J85-EL2 injection molding machine of JSW Co., Ltd. at 350° C. for a cycle time of 1 minute. Further, after the resin was held in the cylinder for 10 minutes, it was molded into a "flat plate for measuring color after residence" (length of 70 mm, width of 50 mm and thickness of 2 mm). The color of the flat plate before and after residence was measured with the C light source by using the SE-2000 of Nippon Denshoku Co., Ltd. to obtain a color difference ΔE from the following equation. As ΔE becomes smaller, molding heat resistance becomes higher.

$$\Delta E = \{(L-L')^2 + (a-a')^2 + (b-b')^2\}^{1/2}$$

color of "flat plate for measuring color before residence": L, a, b color of "flat plate for measuring color after residence": L', a', b'

(6) Molding Heat Resistance (Difference in Residence Molecular Weight)

The viscosity average molecular weight (M) of the "flat plate for measuring color before residence" and the viscosity average molecular weight (M') of the "flat plate for measuring color after residence" obtained in the above test (5) were measured to obtain the difference ΔM (M−M'). As ΔM becomes smaller, molding heat resistance becomes higher.

II. Stabilizer and the Like

The Phosphorus-Based Stabilizers, Release Agents, ultraviolet absorbents and bluing agents used in Examples and Comparative Examples are given below.

1. Phosphorus-Based Stabilizer A (for Comparative Examples)

The HOSTANOX P-EPQ (trade name) phosphonite-based compound (of Clariant Japan Co., Ltd.) was used. Peaks 1 to 6 under the above HPLC measurement conditions are the following phosphorus-based compounds (see FIG. 1).

Figure 1:
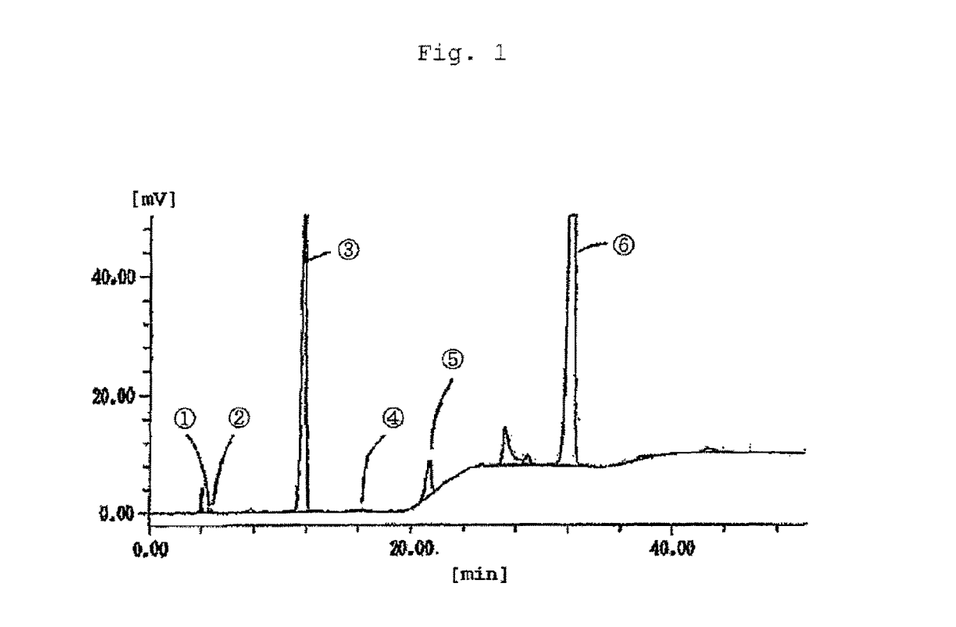
FIG. 1 is a chart showing the HPLC measurement results of a phosphorus-based stabilizer A used in Comparative Examples of the present invention.
Figure 2:
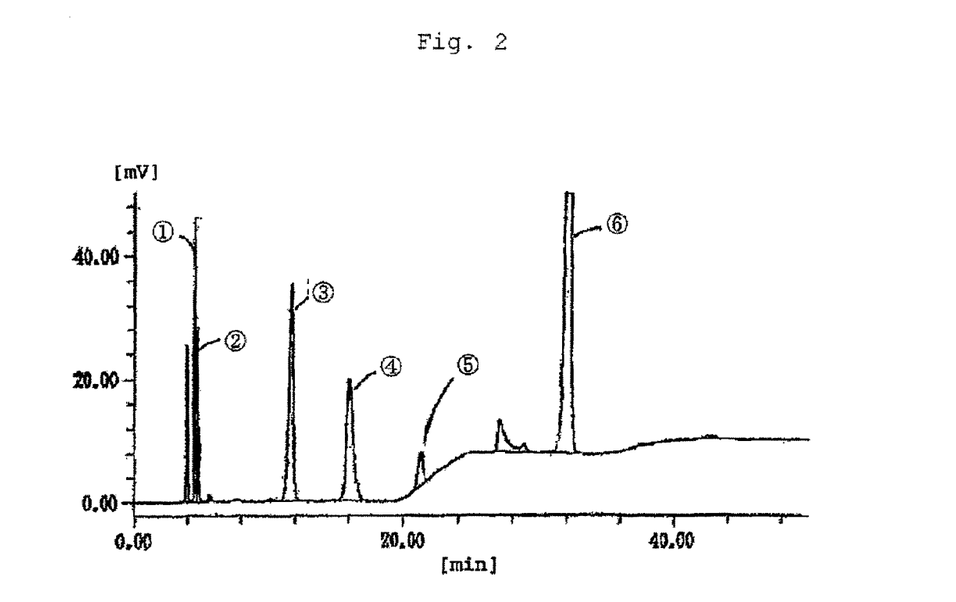
FIG. 2 is a chart showing the HPLC measurement results of a phosphorus-based stabilizer B used in Examples of the present invention.

(1) Component b (1-i) Component b-1 (Peak 4)

a mixture of four components which are 4-bis(2,4-di-tert-butylphenyl)-4'-mono(2,4-di-tert-butyl phenyl)-biphenylene diphosphonite, 4-bis(2,4-di-tert-butylphenyl)-3'-mono(2,4-di-tert-butyl phenyl)-biphenylene diphosphonite, 3-bis(2,4-di-tert-butylphenyl)-4'-mono(2,4-di-tert-butyl phenyl)-biphenylene diphosphonite and 3-bis(2,4-di-tert-butylphenyl)-3'-mono(2,4-di-tert-butyl phenyl)-biphenylene diphosphonite (1-ii) Component b-2 (Peak 2)

a mixture of three components which are 4,4'-bis(2,4-di-tert-butylphenyl)-biphenylene diphosphonite, 3,4'-bis(2,4-di-tert-butylphenyl)-biphenylene diphosphonite and 3,3'-bis(2,4-di-tert-butylphenyl)-biphenylene diphosphonite (1-iii) Component b-3 (Peak 1)

a mixture of two components which are 2,4-di-tert-butylphenyl-4-phenyl-phenyl phosphonite and 2,4-di-tert-butylphenyl-3-phenyl-phenyl phosphonite (2) Component c
(2-i) Component c-1 (Peak 6)
a mixture of three components which are tetrakis(2,4-di-tert-butylphenyl)-4,4'-biphenylene diphosphonite, tetrakis(2,4-di-tert-butylphenyl)-4,3'-biphenylene diphosphonite and tetrakis(2,4-di-tert-butylphenyl)-3,3'-biphenylene diphosphonite
(2-ii) Component c-2 (Peak 3)
a mixture of two components which are bis(2,4-di-tert-butylphenyl)-4-phenyl-phenyl phosphonite and bis(2,4-di-tert-butylphenyl)-3-phenyl-phenyl phosphonite
(3) Other Major Components (Peak 5)
(3-i) tris(2,4-di-tert-butylphenyl)phosphite
    weight ratio of (total amount of components b and c) to (weight of phosphorus-based stabilizer A)=0.91
    weight ratio of (component b) to (component c)=0.004
2. Phosphorus-Based Stabilizer B (for Examples)
    The phosphorus-based stabilizer A which was exposed to a 50° C. and 90% R H atmosphere in a thermo-hygrostat for 24 hours was used. The chart obtained under the above HPLC measurement conditions is shown in FIG. 2.
    weight ratio of (total amount of components b and c) to (weight of phosphorus-based stabilizer B)=0.91
    weight ratio of (component b) to (component c)=0.234
3. Phosphorus-Based Stabilizer C (for Examples)
    The phosphorus-based stabilizer A which was exposed to a 50° C. and 90% R H atmosphere in a thermo-hygrostat for 36 hours was used.
    weight ratio of (total amount of components b and c) to (weight of phosphorus-based stabilizer C)=0.89
    weight ratio of (component b) to (component c)=0.386
4. Another Phosphorus-Based Stabilizer D
tris(2,4-di-tert-butylphenyl)phosphite (Irgafos 168 (trade name) of Ciba Specialty Chemicals Co., Ltd.)
5. Hindered Phenol-Based Stabilizer E
octadecyl-3-(3,5-di-tert-butyl-4-hydroxyphenyl)propionate (Irganox 1076 (trade name) of Ciba Specialty Chemicals Co., Ltd.)
6. Release Agent A (Fatty Acid Ester A)
monoglyceride stearate (acid value of 0.8, purity of 97.0 wt %) (Rikemal S-100A (trade name) of Riken Vitamin Co., Ltd.)
7. Release Agent B (Fatty Acid Ester B)
a mixture of triglyceride stearate and stearyl stearate (acid value of 2.0) (Rikemal SL-900 (trade name) of Riken Vitamin Co., Ltd.)
8. Release Agent C (Fatty Acid Ester C)
pentaerythritol tetrastearate (acid value of 0.6) (Rikestar EW-400 (trade name) of Riken Vitamin Co., Ltd.)
9. Ultraviolet Absorbent A
2-(2-hydroxy-5-tert-octylphenyl)benzotriazole (Chemisorb 79 (trade name) of Chemipro Kasei Kaisha, Ltd.)
10. Ultraviolet Absorbent B
2-(3-tert-butyl-5-methyl-2-hydroxyphenyl)-5-chlorobenzotriazole (Tinubin 326 (trade name) of Ciba Specialty Chemicals Co., Ltd.)
11. Bluing Agent
anthraquinone-based compound (Macrolex Violet B (trade name) of Bayer Co., Ltd.)

Examples 1, 3, 5, 6 and 7 and Comparative Examples 1, 5, 6 and 7

A phosphorus-based stabilizer, a release agent and an ultraviolet absorbent were added to and mixed with 100 parts by weight of a polycarbonate resin obtained from bisphenol A, p-tert-butylphenol (terminal capping agent) and phosgene by the interfacial polymerization process in amounts shown in Tables 2 and 3, the obtained mixture was melt extruded by an extruder at 280° C., and the obtained pellet was stored in a product storage tank, transferred to a blend tank and blended, and then the above evaluations were made on the obtained blends. The results are shown in Tables 2 and 3.
One month passed after the product storage tank, the blend tank and accessory equipment used above were cleaned.

Examples 2 and 4 and Comparative Example 2

A phosphorus-based stabilizer, a release agent and an ultraviolet absorbent were added to and mixed with 100 parts by weight of a polycarbonate resin obtained from bisphenol A, p-tert-butylphenol (terminal capping agent) and phosgene by the interfacial polymerization process in amounts shown in Tables 2 and 3, the obtained mixture was melt extruded by an extruder at 280° C., and the obtained pellet was stored in a product storage tank, transferred to a blend tank and blended, and then the above evaluations were made on the obtained blends. The results are shown in Tables 2 and 3.
One year passed after the product storage tank, the blend tank and accessory equipment used above were cleaned.

Comparative Examples 3 and 4

A phosphorus-based stabilizer, release agent and ultraviolet absorbent were added to and mixed with 100 parts by weight of a polycarbonate resin obtained from bisphenol A, p-tert-butylphenol (terminal capping agent) and phosgene by the interfacial polymerization process in amounts shown in Tables 2 and 3, the obtained mixture was melt extruded by an extruder at 280° C., and the obtained pellet was stored in a product storage tank, transferred to a blend tank and blended, and then the above evaluations were made on the obtained blends. The results are shown in Tables 2 and 3.
Three years passed after the product storage tank, the blend tank and accessory equipment used above were cleaned.

TABLE 2

| | | Weight ratio of component b to component c | Weight ratio of total of components b and c to stabilizer | Ex. 1 | Ex. 2 | Ex. 3 | Ex. 4 | Ex. 5 | Ex. 6 | Ex. 7 |
|---|---|---|---|---|---|---|---|---|---|---|
| Blending ratio (parts by weight) | Polycarbonate resin (viscosity average molecular weight × $10^3$) | — | — | 100 (22.4) | 100 (22.4) | 100 (22.4) | 100 (22.4) | 100 (19.7) | 100 (19.7) | 100 (24.2) |
| | Stabilizer A | 0.004 | 0.91 | | | | | | | |
| | Stabilizer B | 0.234 | 0.91 | 0.020 | 0.020 | | | 0.020 | 0.020 | |

TABLE 2-continued

|  |  | Weight ratio of component b to component c | Weight ratio of total of components b and c to stabilizer | Ex. 1 | Ex. 2 | Ex. 3 | Ex. 4 | Ex. 5 | Ex. 6 | Ex. 7 |
| --- | --- | --- | --- | --- | --- | --- | --- | --- | --- | --- |
|  | Stabilizer C | 0.386 | 0.89 |  |  | 0.020 | 0.020 |  |  | 0.020 |
|  | Stabilizer D | — | — | 0.080 | 0.080 | 0.080 | 0.080 |  | 0.030 |  |
|  | Stabilizer E | — | — | 0.050 | 0.050 | 0.050 | 0.050 |  | 0.050 |  |
|  | Release agent A | — | — | 0.100 | 0.100 | 0.100 | 0.100 | 0.100 |  |  |
|  | Release agent B | — | — |  |  |  |  |  |  | 0.250 |
|  | Release agent C | — | — |  |  |  |  |  | 0.100 |  |
|  | Ultraviolet absorbent A | — | — | 0.300 | 0.300 | 0.300 | 0.300 |  | 0.300 | 0.300 |
|  | Ultraviolet absorbent B | — | — |  |  |  |  |  |  | 0.050 |
|  | Bluing agent | — | — | 0.6 ppm | 0.6 ppm | 0.6 ppm | 0.6 ppm | 0.6 ppm | 0.6 ppm | 0.7 ppm |
| Fe compounds | Fe compound in terms of Fe atom | — | — | 42 ppb | 94 ppb | 53 ppb | 84 ppb | 48 ppb | 57 ppb | 51 ppb |
| color of molded plate (thickness of 5 mm) | YI value | — | — | 1.42 | 1.48 | 1.45 | 1.49 | 1.37 | 1.41 | 1.38 |
|  | dullness (seen, not seen) | — | — | Not seen | Not seen | Not seen | Not seen | Not seen | Not seen | Not seen |
| Molded plate (thickness of 2 mm) | Molded plate (thickness of 2 mm) total light transmittance (%) | — | — | 90 | 90 | 90 | 90 | 90 | 90 | 90 |
| Molding heat resistance | ΔE | — | — | 0.28 | 0.35 | 0.33 | 0.29 | 0.38 | 0.24 | 0.24 |
|  | ΔM | — | — | 0.4 | 0.5 | 0.3 | 0.2 | 0.3 | 0.2 | 0.3 |

Ex.: Example

TABLE 3

|  |  | Weight ratio of component b to component c | Weight ratio of total of components b and c to stabilizer | C. Ex. 1 | C. Ex. 2 | C. Ex. 3 | C. Ex. 4 | C. Ex. 5 | C. Ex. 6 | C. Ex. 7 |
| --- | --- | --- | --- | --- | --- | --- | --- | --- | --- | --- |
| Amount (parts by weight) | Polycarbonate resin (viscosity average molecular weight × 10³) | — | — | 100 (22.4) | 100 (22.4) | 100 (22.4) | 100 (22.4) | 100 (19.7) | 100 (19.7) | 100 (24.2) |
|  | Stabilizer A | 0.004 | 0.91 | 0.020 | 0.020 | 0.020 |  | 0.020 | 0.020 | 0.020 |
|  | Stabilizer B | 0.234 | 0.91 |  |  |  | 0.020 |  |  |  |
|  | Stabilizer C | 0.386 | 0.89 |  |  |  |  |  |  |  |
|  | Stabilizer D | — | — | 0.030 | 0.030 | 0.030 | 0.030 | 0.030 |  |  |
|  | Stabilizer E | — | — | 0.080 | 0.080 | 0.080 | 0.080 | 0.050 |  |  |
|  | Release agent A | — | — | 0.100 | 0.100 | 0.100 | 0.100 |  | 0.100 |  |
|  | Release agent B | — | — |  |  |  |  |  |  | 0.250 |
|  | Release agent C | — | — |  |  |  |  | 0.100 |  |  |
|  | Ultraviolet absorbent A | — | — | 0.300 | 0.300 | 0.300 | 0.300 | 0.300 |  | 0.300 |
|  | Ultraviolet absorbent B | — | — |  |  |  |  |  |  | 0.050 |
|  | Bluing agent | — | — | 0.6 ppm | 0.6 ppm | 0.6 ppm | 0.6 ppm | 0.6 ppm | 0.6 ppm | 0.7 ppm |
| Fe compounds | Fe compound in terms of Fe atom | — | — | 46 ppb | 89 ppb | 124 ppb | 132 ppb | 36 ppb | 49 ppb | 38 ppb |
| color of molded plate (thickness of 5 mm) | YI value | — | — | 1.51 | 1.57 | 1.67 | 1.71 | 1.53 | 1.49 | 1.51 |
|  | dullness (seen, not seen) | — | — | Not seen | Seen | Seen | Seen | Not seen | Not seen | Not seen |

TABLE 3-continued

| | | Weight ratio of component b to component c | Weight ratio of total of components b and c to stabilizer | C. Ex. 1 | C. Ex. 2 | C. Ex. 3 | C. Ex. 4 | C. Ex. 5 | C. Ex. 6 | C. Ex. 7 |
|---|---|---|---|---|---|---|---|---|---|---|
| Molded plate (thickness of 2 mm) | Total light transmittance rate (%) | — | — | 90 | 90 | 90 | 90 | 90 | 90 | 90 |
| Molding heat resistance | ΔE | — | — | 0.66 | 0.78 | 0.93 | 0.69 | 0.81 | 0.72 | 0.83 |
| | ΔM | — | — | 1.8 | 1.9 | 2.3 | 1.7 | 1.3 | 1.6 | 1.4 |

C. Ex.: Comparative Example

Effect of the Invention

According to the present invention, by containing a specific phosphorus-based compound (component b) in a polycarbonate resin (component a), molding heat resistance can be improved with a small amount of the phosphorus-based component. According to the present invention, by reducing the content of an Fe compound in a granule of the polycarbonate resin to not more than a specific value, a molded article having a good color and high transparency can be obtained.

INDUSTRIAL APPLICABILITY

Since the molded article obtained by the present invention has excellent heat resistance, color and total transmittance (transparency), it is advantageously used as an optical lens, particularly a spectacle lens.

The invention claimed is:

1. A method of producing a molded article comprising melting a granule at a temperature of 280 to 380° C. and molding it, wherein
the granule satisfies the following conditions (I) and (II):
(I) when 100 parts by weight of the granule is cleaned with 100 parts by weight of a 1N nitric acid aqueous solution, the amount of an Fe compound eluted into the 1N nitric acid aqueous solution cleaning fluid is 1 to 100 ppb in terms of the Fe atom based on the granule; and
(II) the granule comprises:
(A) 100 parts by weight of a polycarbonate resin (component a), and
(B) 0.00010 to 0.5 part by weight of at least one phosphorus-based compound (component b) selected from the group consisting of a phosphorus-based compound represented by the following formula (1) (component b-1), a phosphorus-based compound represented by the following formula (2) (component b-2) and a phosphorus-based compound represented by the following formula (3) (component b-3), (1)

wherein $Ar_1$, $Ar_2$ and $Ar_5$ may be the same or different and are each an aromatic hydrocarbon group having 6 to 20 carbon atoms which may have an alkyl substituent,
to obtain the molded article.

2. The method according to claim 1, wherein the granule satisfies the following condition (III) in addition to the conditions (I) and (II):
(III) the granule comprises (A) the polycarbonate resin (component a), (B) the phosphorus-based compound represented by the formula (1) (component b-1), the phosphorus-based compound represented by the formula (2) (component b-2) and the phosphorus-based compound represented by the formula (3) (component b-3), and (C) a phosphorus-based compound represented by the following formula (4) (component c-1) and a phosphorus-based compound represented by the following formula (5) (component c-2); and the total amount of the components b-1 to b-3 and the components c-1 and c-2 is 0.0005 to 0.5 part by weight based on 100 parts by weight of the component a, and the weight ratio (x/y) of the total amount (x parts by weight) of the components b-1 to b-3 to the total amount (y parts by weight) of the components c-1 and c-2 is 0.01 to 2.0, (4)

(5)

wherein $Ar_3$ and $Ar_6$ may be the same or different and are each an aromatic hydrocarbon group having 6 to 20 carbon atoms which may have an alkyl substituent.

3. The method according to claim 1, wherein the component b-1 is selected from the group consisting of:
 4-bis(2,4-di-tert-butylphenyl)-4'-mono(2,4-di-tert-butylphenyl)-biphenylene diphosphonite,
 4-bis(2,4-di-tert-butylphenyl)-3'-mono(2,4-di-tert-butylphenyl)-biphenylene diphosphonite,
 3-bis(2,4-di-tert-butylphenyl)-4'-mono(2,4-di-tert-butylphenyl)-biphenylene diphosphonite, and
 3-bis(2,4-di-tert-butylphenyl)-3'-mono(2,4-di-tert-butylphenyl)-biphenylene diphosphonite.

4. The method according to claim 1, wherein the component b-2 is selected from the group consisting of:
 4,4'-bis(2,4-di-tert-butylphenyl)-biphenylene diphosphonite,
 3,4'-bis(2,4-di-tert-butylphenyl)-biphenylene diphosphonite, and
 3,3'-bis(2,4-di-tert-butylphenyl)-biphenylene diphosphonite.

5. The method according to claim 1, wherein the component b-3 is 2,4-di-tert-butylphenyl-4-phenyl-phenyl phosphonite or 2,4-di-tert-butylphenyl-3-phenyl-phenyl phosphonite.

6. The method according to claim 2, wherein the component c-1 is selected from the group consisting of:
 tetrakis(2,4-di-tert-butylphenyl)-4,4'-biphenylene diphosphonite,
 tetrakis(2,4-di-tert-butylphenyl)-4,3'-biphenylene diphosphonite, and
 tetrakis(2,4-di-tert-butylphenyl)-3,3'-biphenylene diphosphonite.

7. The method according to claim 2, wherein the component c-2 is bis(2,4-di-tert-butylphenyl)-4-phenyl-phenyl phosphonite or bis(2,4-di-tert-butylphenyl)-3-phenyl-phenyl phosphonite.

8. The method according to claim 1, wherein the molded article is an optical lens.

9. The method according to claim 1, wherein the molded article is a spectacle lens.

10. A method of preventing the coloring of a molded article when a granule is molded, wherein the granule satisfies the following conditions (I) and (II):

(I) when 100 parts by weight of the granule is cleaned with 100 parts by weight of a 1N nitric acid aqueous solution, the amount of an Fe compound eluted into the 1N nitric acid aqueous solution cleaning fluid is 1 to 100 ppb in terms of the Fe atom based on the granule; and

(II) the granule comprises:

(A) 100 parts by weight of a polycarbonate resin (component a), and

(B) 0.00010 to 0.5 part by weight of at least one phosphorus-based compound (component b) selected from the group consisting of a phosphorus-based compound represented by the following formula (1) (component b-1), a phosphorus-based compound represented by the following formula (2) (component b-2) and a phosphorus-based compound represented by the following formula (3) (component b-3),

(1)

(2)

(3)

wherein Ar$_1$, Ar$_2$ and Ar$_5$ may be the same or different and are each an aromatic hydrocarbon group having 6 to 20 carbon atoms which may have an alkyl substituent,
to prevent the coloring of the molded article.

11. The method according to claim 10, wherein the granule satisfies the following condition (III) in addition to the conditions (I) and (II):

(III) the granule comprises (A) the polycarbonate resin (component a), (B) the phosphorus-based compound represented by the formula (1) (component b-1), the phosphorus-based compound represented by the formula (2) (component b-2) and the phosphorus-based compound represented by the formula (3) (component b-3), and (C) a phosphorus-based compound represented by the following formula (4) (component c-1) and a phosphorus-based compound represented by the following formula (5) (component c-2); and the total amount of the components b-1 to b-3 and the components c-1 and c-2 is 0.0005 to 0.5 part by weight based on 100 parts by weight of the component a, and the weight ratio (x/y) of the total amount (x parts by weight) of the components b-1 to b-3 to the total amount (y parts by weight) of the components c-1 and c-2 is 0.01 to 2.0,

(1)

(2)

(3)

wherein Ar$_3$ and Ar$_6$ may be the same or different and are each an aromatic hydrocarbon group having 6 to 20 carbon atoms which may have an alkyl substituent.

12. The method according to claim 10, wherein the component b-1 is selected from the group consisting of:
  4-bis(2,4-di-tert-butylphenyl)-4'-mono(2,4-di-tert-butylphenyl)-biphenylene diphosphonite,
  4-bis(2,4-di-tert-butylphenyl)-3'-mono(2,4-di-tert-butylphenyl)-biphenylene diphosphonite,
  3-bis(2,4-di-tert-butylphenyl)-4'-mono(2,4-di-tert-butylphenyl)-biphenylene diphosphonite, and
  3-bis(2,4-di-tert-butylphenyl)-3'-mono(2,4-di-tert-butylphenyl)-biphenylene diphosphonite.

13. The method according to claim 10, wherein the component b-2 is selected from the group consisting of:
  4,4'-bis(2,4-di-tert-butylphenyl)-biphenylene diphosphonite,
  3,4'-bis(2,4-di-tert-butylphenyl)-biphenylene diphosphonite, and
  3,3'-bis(2,4-di-tert-butylphenyl)-biphenylene diphosphonite.

14. The method according to claim 10, wherein the component b-3 is 2,4-di-tert-butylphenyl-4-phenyl-phenyl phosphonite or 2,4-di-tert-butylphenyl-3-phenyl-phenyl phosphonite.

15. The method according to claim 10, wherein the component c-1 is selected from the group consisting of:
  tetrakis(2,4-di-tert-butylphenyl)-4,4'-biphenylene diphosphonite,
  tetrakis(2,4-di-tert-butylphenyl)-4,3'-biphenylene diphosphonite, and
  tetrakis(2,4-di-tert-butylphenyl)-3,3'-biphenylene diphosphonite.

16. The method according to claim 10, wherein the component c-2 is bis(2,4-di-tert-butylphenyl)-4-phenyl-phenyl phosphonite or bis(2,4-di-tert-butylphenyl)-3-phenyl-phenyl phosphonite.

17. The method according to claim 10, wherein the molded article is an optical lens.

18. The method according to claim 10, wherein the molded article is a spectacle lens.

* * * * *